March 9, 1943. E. B. GROVER 2,313,336
APPARATUS FOR TESTING THE DENSITY OF THREAD PACKAGES
Filed May 11, 1940
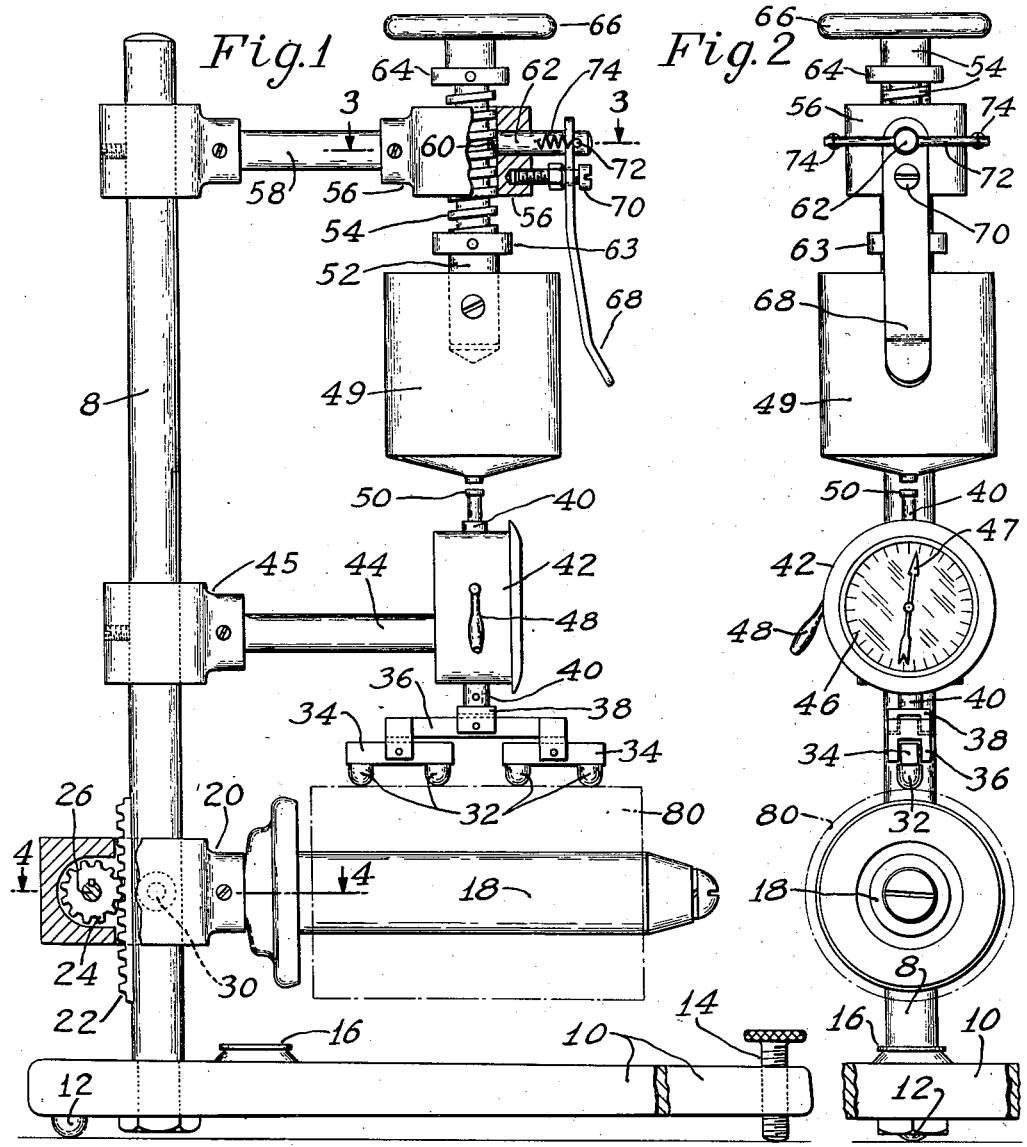
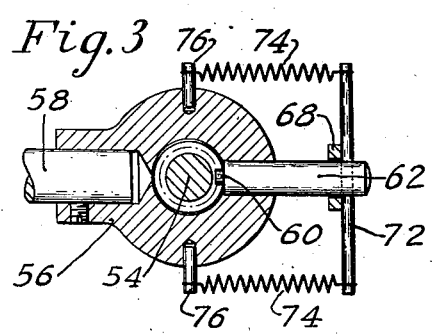
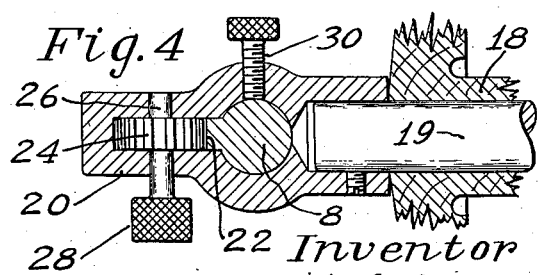
Witness: Charles J. Olson
Inventor
Elliot B. Grover Patented Mar. 9, 1943

2,313,336

UNITED STATES PATENT OFFICE 2,313,336

APPARATUS FOR TESTING THE DENSITY OF THREAD PACKAGES

Elliot B. Grover, Providence, R. I., assignor to Manville Jenckes Corporation, Manville, R. I., a corporation of Delaware Application May 11, 1940, Serial No. 334,562

6 Claims. (Cl. 265—12)

The present invention relates to an apparatus for testing the density of thread packages for dyeing, tinting, bleaching and the like, in which the treating fluid is surged through the package.

For the performance of such processing operations, it is the usual practice to place a relatively large number of conventionally wound hollow thread packages on perforated spools within a kier, the treating fluid then being forced in either direction through the package walls to effect the desired processing operation. Alternatively, such packages may be arranged in a solid mass for the forcing of the treating fluid therethrough. It is well known that variation in density of otherwise identical packages has the effect of producing variations in the color shade of the threads. The density of thread packages is directly dependent upon variations in tension on the feeding yarn during the package winding operation. In accordance with the usual practice, the operator is expected to obtain a rough test of individual packages for density by their feel to the hand. Dry testing for density has also been attempted with the use of a density tester of the manual type using a thin penetration pin which operates on the principle of pushing individual threads aside seeking the path of least resistance. Testing in this manner, however, is not reliable, nor does it provide a sufficiently accurate standard of testing available for general use.

It is a principal object of the present invention to provide a novel apparatus which is particularly adapted for obtaining dry test of the relative density of individual thread packages in accordance with an accurate and always available norm, whereby the dye characteristic of packages produced on individual spindles may be easily and accurately determined, and adjustments of the thread tension for the winding of individual spindles may be made to insure a uniform quality of thread packages for dyeing and similar operations.

It is a further object of the invention to provide an apparatus for measuring the density of thread packages which will operate with certainty and accuracy to determine the density thereof for dyeing independently of the spacing of the wind, thickness of package wall, unevenness of the peripheral surface of the package, and other variables of this sort applicable to individual packages.

With these and other objects in view, a principal feature of the invention consists in the provision of a density measuring device which operates to compress a portion or portions of the package wall comprising a substantial surface area extending over a plurality of threads of the package wind under a known pressure, and to measure the distance by which this surface area is compressed by this known pressure.

Another feature of the invention consists specifically in the provision of a density testing device including a presser foot having a plurality of contact members spaced from one another along the length of the package, and each having a substantial package engaging surface area, and of which the several contact members are individually adjustable to engage with and to be pressed with equally distributed force against the engaged surface of the package wall.

The several features of the invention consist also in the combinations, devices and arrangement of parts hereinafter described and claimed, which together with the advantages to be obtained thereby will be readily understood by one skilled in the art from the following description taken in connection with the accompanying drawing, in which Fig. 1 is a view in left side elevation of applicant's density testing device, portions being broken away to show underlying operating parts; Fig. 2 is a front elevation of the density testing device shown in Fig. 1; Fig. 3 is an enlarged detail sectional view on the line 3—3 of Fig. 1; and Fig. 4 is an enlarged detail sectional view taken on the line 4—4 of Fig. 1.

Referring to the drawing, applicant's testing apparatus comprises a vertically arranged standard or post 8 and a Y-shaped supporting base 10 for the standard 8 having a single rear supporting leg 12, and at each of its forward extremities adjustable legs comprised by adjusting screws 14 screw-threaded to the base. A water level generally designated at 16 is provided for the assistance of the operator in leveling the apparatus. An internal support for packages to be tested is provided in the form of a horizontally extending spindle 18 carried on a shaft 19 which is rigidly secured to a bracket 20 vertically adjustable on the standard 8. For effecting vertical adjustment of the work support, a rack 22 is provided at the rear side of the standard 8 which is engaged by a pinion 24 keyed to a transversely extending shaft 26 mounted in a journal in the bracket 20. At its outer end the shaft 26 is provided with a knurled adjusting knob 28. A manually adjustable set screw 30 threaded to the bracket 20 for engagement with the standard 8 provides convenient means for locking the bracket 20 and work supporting spindle 18 in adjusted position.

For testing the density of thread packages supported on the spindle 18, applicant provides a presser foot comprising four nub-shaped contact members 32 which are mounted in pairs on opposite ends of transverse links 34. Each of the links 34 is pivotally connected intermediate its length to the opposite end of a transverse link 36 which in turn is pivotally connected at 38 intermediate its length with the lower end of a vertically arranged stem 40.

With this construction and arrangement of the presser foot, it will readily be seen that the balanced linkage connection provided permits each of the contact members 32 to adjust itself freely to secure a firm engagement with the surface of the thread package to be tested. The pressure exerted through the stem 40 is distributed equally over the several contact members 32, causing an equalized pressure to be brought to bear thereon. This arrangement of the presser foot has the specific advantage that the differences of density which may exist in different parts of the package, causing the individual contact members 32 to be pressed varying distances into the package, will be averaged in the movement imparted to the stem 40, which therefore provides an indication of average density for the entire package. The rounded nub-like package engaging surfaces of the contact member illustrated in the drawing, when forced against the package under a light initial pressure, tend to indent themselves slightly into the package wall, insuring a firm engaging contact therewith which will be relatively unaffected by any irregularities in the peripheral surface of the package caused by uneven distribution of the thread. The fingers are preferably ¼" to ½" in diameter, in order that they may engage with a relatively large number of threads of the package wind to produce a pressing rather than a piercing action against the package wall. The particular arrangement of the presser foot illustrated is intended for use with a package which may be 5" in diameter, and 7 or 8 inches in length. It will be understood that if so desired, a single contact finger or a single pair of fingers directly connected to the link 36 may be employed as, for example, where smaller or different shaped packages are to be tested.

The stem 40 forms part of a dial indicator device generally designated at 42 carried at the forward end of a horizontally extending shaft 44 fixed to a bracket 45 adjustably mounted on the standard 8. The dial indicator mechanism 42 comprises a casing having thereon a dial 46 graduated in thousandths of an inch, and a pointer 47 which is operatively connected with the stem 40 through gear connections of ordinary description (not shown). A manual control handle 48 located at one side of the casing provides convenient means for manually raising the stem 40 and presser foot from package engaging position.

Directly above the stem 40 there is suspended a weight 49 which is arranged to be brought into engagement with a supporting shoe 50 on the upper end of the stem 40. The weight 49 is rigidly supported by means of a pin 52 to the lower end of a vertically arranged screw shaft 54 which is slidably mounted in a journal formed in a bracket support 56 forming part of an arm support 58 adjustably secured to the standard 8. For the manual operation of raising and lowering the weight 49, the screw-threaded portion of the shaft 54 is arranged to be engaged by a spur 60 formed on one end of a pin 62 slidably mounted in a journal in the bracket 56. Collars 63 and 64 on the screw shaft 54 are arranged for engagement respectively with the upper and lower sides of the brackets 56 to limit vertical movement of the screw shaft 54 and weight 49 in each direction. A hand wheel 66 secured to the upper end of the screw shaft 54 provides convenient means under the control of the operator for raising and lowering the weight.

The weight 49 is arranged to be released from its supporting mechanism when brought into engagement with the shoe 50 on the stem 40 in order to apply a pressure of predetermined value on the presser foot and external surface of the package to be tested. For this purpose a manual control lever 68 is provided to withdraw the pin 62 and spur 60 from engagement with the screw threads on the screw shaft 54. The lever 68 is pivotally supported on a shouldered pin 70, and at its upper end engages a cross pin 72 mounted in the forward end of the spur pin 62. Tension springs 74 connected between opposite ends of the cross pin 62 and anchoring pins 76 on the bracket 56 tend normally to maintain the pin 62 and spur 60 in meshing relation with the screw threads on the screw shaft 54.

A preferred mode of operation of applicant's device to test the density of individual packages, may be briefly described as follows: It will be assumed that the apparatus has been properly levelled by means of adjusting screws 14 and with the assistance of the water level 16, that the weight 49 has been moved to its topmost position by rotating hand wheel 66, and that the stem 40 has also been raised by actuation of the handle 48. A thread package of ordinary description designated at 80 is then placed on spindle 18 which is adjustably supported so that the downward actuation of the handle 48 will lower stem 40 and the presser foot including the contact fingers 32 into engagement with the peripheral surface of the package 80 for a low reading of the pointer 47 on the dial 46. The weight is now lowered by rotation of the hand wheel 66 until it is brought into engagement with the shoe 50 on stem 40, this lowering movement being continued until the dial indicator is advanced a few additional thousandths of an inch to indicate that positive contact has been obtained between all of the contact nubs 32 of the presser foot with the surface of the package 80. For this position of the parts in which the weight 49 is positively connected through its engagement with the stem 40 to the contact nubs 32 of the presser foot in engagement with the package, the hand lever 68 is now pressed to withdraw the pin 62 and spur 60 and thereby to release the weight 49 which causes the contact fingers 32 to be forced into the package under a predetermined pressure. The depth of the compression thus obtained will by the application of the predetermined additional pressure represented by weight 49, now be obtained by subtracting the initial reading of the dial from the final reading now obtained.

Variations in the amount of compression obtained as determined by the reading of the dial indicator device in the testing of successive packages will indicate a relative condition of density or hardness of each individual package, and will provide an accurate guide for the assistance of the operator in adjusting the thread tension as applied to the particular spindles on which the packages were wound. The standard for density of the package will be determined in accordance with the operating conditions. A typical standard established for a Franklin spring-wound cotton thread package 5" in diameter is 250 thousandths of an inch, with a tolerance of approximately 25 thousandths of an inch from this standard. The weight of the operating parts may be assumed to be as follows: For use in the testing of cotton thread packages, the screw-threaded shaft 54 and its attached parts will have an approximate weight of 13½ ounces, the dial indicator mechanism including the presser foot and stem 40 will have an approximate weight of 4½ ounces, and the weight 49 will be 9 pounds 14 ounces, making a total of 11 pounds. Other conditions remaining the same, for the testing of spun rayon packages a weight 49 of 22 ounces is preferred, giving a total of 2½ pounds.

It will be understood that applicant is not limited to the particular construction and arrangement of the parts illustrated, and that a different operating norm for the amount of compression to be expected, and varying tolerances may be employed, depending on the size, form, content and desired standard of quality of the packages to be tested.

It will be understood that the invention is not limited to the specific embodiment shown, and that various deviations may be made therefrom without departing from the spirit and scope of the appended claims.

What is claimed is:

1. In a testing apparatus for testing the density of hollow thread packages for dyeing and similar operations, the combination of a support having a package engaging surface of substantial area for supporting the package wall, a presser foot engageable against an opposed face of the package wall comprising a plurality of contact members spaced from one another and each having a substantial package engaging surface area extending over a plurality of threads of the package wind, a stem on which said presser foot is movable toward and away from the support, means for supporting the contact members from the stem arranged to permit relative movement of said contact members and including means for transferring pressure from said stem in equal amounts to the several contact members, means for moving said stem to engage the presser foot against the package wall under an initial pressure, means acting on the stem to increase the engaging pressure of the presser foot against the package by a predetermined amount, and an indicator connected with the stem to indicate the distance of movement of the stem and presser foot thereon into the package wall caused by said predetermined increase of the engaging pressure.

2. In a testing apparatus for testing the density of thread packages for dyeing and similar operations, the combination of a support for the package, a presser foot engageable against an opposed face of the package through which treating fluid is to be surged comprising a plurality of contact members spaced from one another and each having a package engaging surface area extending over a plurality of threads of the package wind, a stem on which said presser foot is movable toward and away from the support, balanced supporting connections between the stem and the contact members arranged to permit relative adjustment thereof under equalized pressure against the face of the package, means for moving said stem to engage the presser foot against the package under an initial pressure, means acting on the stem to increase the engaging pressure of the presser foot against the package by a predetermined amount, and an indicator connected with the stem to indicate the distance of movement of the stem and presser foot thereon into the package caused by said predetermined increase of the engaging pressure.

3. In a testing apparatus for testing the density of hollow thread packages for dyeing and similar operations, the combination of a support for the package wall, a presser foot engageable against the opposed face of the package wall comprising a plurality of contact members each having a substantial package surface engaging area, a stem on which said presser foot is movable toward and away from the support, a balanced linkage supporting connection between the stem and said contact members to permit individual adjustment of the contact members under equalized pressure against the surface of the package wall, means for moving said stem to engage the presser foot against the package wall under an initial pressure, means acting on the stem for increasing the engaging pressure of the presser foot against the package wall by a predetermined amount, and an indicator connected to the stem to indicate the distance of movement of the presser foot against the package introduced by said predetermined increase of the engaging pressure.

4. In a testing apparatus for testing the density of thread packages for dyeing and similar operations, the combination of an internal support for the package, a presser foot having a substantial package engaging surface area, a vertically movable stem on which the contactor is carried, an indicator to indicate the distance in movement of the stem, a manual connection acting on the stem to move the presser foot into and out of package engaging position, a weight movable vertically into engagement with the stem, a manually operable screw and nut connection for raising and lowering the weight, and manually operable means to operatively disconnect the screw and nut connection to release the weight.

5. In a testing apparatus for testing the density of thread packages for dyeing and similar operations, the combination of a horizontally disposed internal support for the package, a presser foot comprising four contact elements each having a substantial package engaging surface area, a stem, a balanced supporting connection between the stem and said contact elements comprising a transverse link pivotally connected intermediate its length with the stem, and a pair of transverse element supporting links each pivotally connected intermediate its length to the opposite end of the first mentioned link, an indicator connected with the stem to indicate the distance of movement thereof, a weight engageable with the stem, manually operable means for moving the weight vertically against the stem, and means to release the weight from its actuating means.

6. In a testing apparatus for testing the density of thread packages for dyeing and similar operations, the combination of an internal support for the package, a presser foot having a substantial package engaging surface area, a vertically movable stem on which the presser foot is carried, an indicator to indicate the distance of movement of the stem, a manually operated connection acting on the stem to move the presser foot into and out of package engaging position, a weight movable vertically into engagement with the stem, a manually operable screw and nut connection for raising and lowering the weight comprising a screw rotatably connected to the weight and a relatively stationary spur member having engagement with the screw, and manually operable means to withdraw the spur from engagement with the screw and thereby to release the weight.

ELLIOT B. GROVER.